(12) United States Patent
Cui et al.

(10) Patent No.: US 12,261,643 B2
(45) Date of Patent: Mar. 25, 2025

(54) DATA TRANSCEIVING CONTROL METHOD AND APPLICATION SYSTEM THEREFOR

(71) Applicant: Sungrow Power Supply Co., Ltd., Hefei (CN)

(72) Inventors: Yuqing Cui, Anhui (CN); Jiacai Zhuang, Anhui (CN); Fushuai Zhuang, Anhui (CN); Yuan Zhuang, Anhui (CN); Jun Xu, Anhui (CN)

(73) Assignee: Sungrow Power Supply Co., Ltd., Hefei (CN)

( * ) Notice: Subject to any disclaimer, the term of this patent is extended or adjusted under 35 U.S.C. 154(b) by 634 days.

(21) Appl. No.: 17/610,126

(22) PCT Filed: Mar. 16, 2021

(86) PCT No.: PCT/CN2021/080992
§ 371 (c)(1),
(2) Date: Nov. 9, 2021

(87) PCT Pub. No.: WO2021/197044
PCT Pub. Date: Oct. 7, 2021

(65) Prior Publication Data
US 2022/0216918 A1    Jul. 7, 2022

(30) Foreign Application Priority Data
Mar. 30, 2020  (CN) .................. 202010238233.0

(51) Int. Cl.
*H04B 10/00*    (2013.01)
*H04B 10/2575*  (2013.01)
*H04B 10/40*    (2013.01)
(52) U.S. Cl.
CPC ....... *H04B 10/25759* (2013.01); *H04B 10/40* (2013.01)

(58) Field of Classification Search
CPC .............. H04B 10/40; H04B 10/25759; H04B 10/25753; H04B 10/2507; H04B 10/0795;
(Continued)

(56) References Cited

U.S. PATENT DOCUMENTS 5,610,749 A * 3/1997 Mizoguchi ........... H04B 10/278
                                                398/166
2005/0201305 A1  9/2005 Shibata et al.
(Continued)

FOREIGN PATENT DOCUMENTS

CN       101635712 A       1/2010
CN       101686083 A       3/2010
(Continued)

OTHER PUBLICATIONS

International Search Report and Written Opinion for International Application No. PCT/CN2021/080992, mailed Jun. 21, 2021.
(Continued)

*Primary Examiner* — Hanh Phan
(74) *Attorney, Agent, or Firm* — Wolf, Greenfield & Sacks, P.C.

(57) ABSTRACT

A method for controlling data transmission and reception and an application system thereof are provided. In the method, the peer-to-peer communication system is initialized to set each communication unit in the peer-to-peer communication system to be in a data receiving state. A communication host controls, according to a communication status of the peer-to-peer communication system, a controlled electrical connection path between the communication host and a communication interface to the communication transmission path, to work in a mode allowing data transmission from the communication slave to a communication host side of the controlled electrical connection path, or a mode allowing data transmission from the communi-
(Continued)

cation host side of the controlled electrical connection path to the communication slave.

14 Claims, 6 Drawing Sheets

(58) Field of Classification Search
CPC .............................. H04B 10/27; H04B 10/0779; H04B 10/2503; H04Q 11/0003; H04Q 11/0005; H04Q 11/0067; H04Q 11/0066
USPC ....... 398/135, 136, 137, 138, 139, 141, 158, 398/159, 45, 48, 49, 33, 38, 2, 3, 4, 5, 398/22, 23, 24, 25, 115, 41
See application file for complete search history.

(56) References Cited

U.S. PATENT DOCUMENTS

| | | | |
|---|---|---|---|
| 2008/0152024 A1* | 6/2008 | Takeuchi | H04L 5/18 375/257 |
| 2011/0103224 A1 | 5/2011 | Nishioka et al. | |
| 2015/0234764 A1 | 8/2015 | Kline | |
| 2019/0109881 A1 | 4/2019 | Gustlin et al. | |

FOREIGN PATENT DOCUMENTS

| | | |
|---|---|---|
| CN | 101785282 A | 7/2010 |
| CN | 102075316 A | 5/2011 |
| CN | 105515615 A | 4/2016 |
| CN | 110138810 A | 8/2019 |
| CN | 111431605 A | 7/2020 |
| EP | 0 671 833 A2 | 9/1995 |
| JP | 2010-239313 A | 10/2010 |
| JP | 5891086 B2 | 3/2016 |

OTHER PUBLICATIONS

Extended European Search Report for European Application No. 21780485.5, dated Jul. 18, 2023.
Examination Report for Indian Application No. 202147048633, dated Nov. 9, 2022.

* cited by examiner

DATA TRANSCEIVING CONTROL METHOD AND APPLICATION SYSTEM THEREFOR This application is a national stage filing under 35 U.S.C. § 371 of International Patent Application Serial No. PCT/CN2021/080992, filed Mar. 16, 2021, which claims priority to Chinese Patent Application No. 202010238233.0, titled "DATA TRANSCEIVING CONTROL METHOD AND APPLICATION SYSTEM THEREFOR", filed on Mar. 30, 2020 with the China National Intellectual Property Administration. The contents of these applications are incorporated herein by reference in their entireties.

FIELD

The present disclosure relates to the field of communication technology, and in particular to a method for controlling data transmission and reception and an application system thereof.

BACKGROUND

In the optical fiber communication, information is transmitted by using optical waves as carriers and using optical fibers as transmission medium. The optical fiber communication is widely used for its advantages of broad transmission frequency, long transmission distance, and strong anti-interference ability. FIG. 1 shows a peer-to-peer optical fiber communication system, in which two communication units are connected by two sets of optical fibers, namely a communication data line DATA and a communication transmission and reception control line CT. When the line CT is in a state 1, a communication unit 1 transmits data through a line DATA-1 to a communication unit 2. When the line CT is in a state 2, the communication unit 2 transmits data through a line DATA-2 to the communication unit 1.

Since optical fibers cannot be directly connected as electric wires, an optical fiber interface, such as the optical fiber interface provided between an optical fiber connection and an electrical connection as shown in FIG. 1, is used to transmit an optical fiber communication signal to a communication unit. At present, the optical fiber interface is generally expensive, and therefore the communication transmission and reception control line CT is usually removed in an actual system, resulting in a peer-to-peer optical fiber communication system as shown in FIG. 2. In the peer-to-peer optical fiber communication system shown in FIG. 2, a coordinated control unit for scheduling timing for data transmission and reception of each communication unit is provided in order to ensure well-scheduled data transmission and reception of communication units in the system. However, provision of the coordinated control unit increases a cost for the communication system.

SUMMARY

In view of above, an objective of the present disclosure is to provide a method for controlling data transmission and reception and an application system thereof, which can avoid the problem of cost increase due to the coordinated control unit added for scheduling timings of data transmission and reception between communication units in the conventional technology.

According to a first aspect of the present disclosure, a method for controlling data transmission and reception is provided. The method is applied to a peer-to-peer communication system, in which a communication unit at either end of a communication transmission path serves as a communication host, and a communication unit at the other end of the communication transmission path serves as a communication slave. The method includes steps of: initializing the peer-to-peer communication system to set each communication unit in the peer-to-peer communication system to be in a data receiving state; and controlling, by the communication host according to a communication status of the peer-to-peer communication system, a controlled electrical connection path between the communication host and a communication interface to the communication transmission path, to work in a mode allowing data transmission from the communication slave to a communication host side of the controlled electrical connection path, or a mode allowing data transmission from the communication host side of the controlled electrical connection path to the communication slave.

In an embodiment, the step of controlling, by the communication host according to a communication status of the peer-to-peer communication system, a controlled electrical connection path between the communication host and a communication interface to the communication transmission path, to work in a mode allowing data transmission from the communication slave to a communication host side of the controlled electrical connection path, or a mode allowing data transmission from the communication host side of the controlled electrical connection path to the communication slave includes: determining, by the communication host, a communication initiating unit in the peer-to-peer communication system, where the communication initiating unit is a communication unit that initiates communication in the peer-to-peer communication system.

In a case where the communication initiating unit is located on the communication host side of the controlled electrical connection path, the communication host performs the following steps repeatedly to keep the communication in the peer-to-peer communication system: controlling the controlled electrical connection path to work in an output mode to allow data transmission from the communication host side of the controlled electrical connection path to the communication slave; and then controlling, after the communication host side of the controlled electrical connection path finishes transmitting data, the controlled electrical connection path to work in a receiving mode, to allow data transmission from the communication slave to the communication host side of the controlled electrical connection path.

In a case where the communication initiating unit is located on a communication slave side of the controlled electrical connection path, the communication host performs the following steps repeatedly to keep the communication in the peer-to-peer communication system: controlling the controlled electrical connection path to work in the receiving mode to allow data transmission from the communication slave to the communication host side of the controlled electrical connection path; and then controlling, in a case where the communication host is required to transmit data, the controlled electrical connection path to work in the output mode to allow data transmission from the communication host to the communication slave, until the communication host finishes transmitting data.

In an embodiment, the step of controlling, by the communication host according to a communication status of the peer-to-peer communication system, a controlled electrical connection path between the communication host and a communication interface to the communication transmission path, to work in a mode allowing data transmission from the communication slave to a communication host side of the controlled electrical connection path, or a mode allowing data transmission from the communication host side of the controlled electrical connection path to the communication slave further includes: controlling, in a case where the communication host fails to receive data from the communication slave in a preset time period, the controlled electrical connection path to work in the output mode to allow data transmission from the communication host to the communication slave.

In an embodiment, in a case where the communication initiating unit is the communication host, a maximum value T of the preset time period is calculated by an equation T=T1+T2+T3, where T1 represents a maximum time period from a time instant at which the communication host finishes transmitting data to a time instant at which the communication slave determines that the communication slave finishes receiving the data from the communication host, T2 represents a time period required for the communication slave to transmit data, and T3 represents a maximum time period from a time instant at which the communication slave finishes transmitting data to a time instant at which the communication host determines that the communication host finishes receiving the data from the communication slave.

In an embodiment, the peer-to-peer communication system is provided with at least one another communication unit on the communication host side, and the at least one another communication unit each serves as a bus-sharing device and is connected to the controlled electrical connection path by sharing a communication bus with the communication host. In a case where the communication initiating unit is the bus-sharing device, the maximum value T of the preset time period is calculated by an equation T=T4+T5+T2+T3, where T4 represents a maximum time period from a time instant at which the bus-sharing device finishes transmitting data to a time instant at which the communication host determines that the communication host finishes receiving the data from the bus-sharing device, T5 represents a maximum time period from a time instant at which the bus-sharing device finishes transmitting data to a time instant at which the communication slave determines that the communication slave finishes receiving the data from the bus-sharing device, T2 represents a time period required for the communication slave to transmit data, and T3 represents a maximum time period from a time instant at which the communication slave finishes transmitting data to a time instant at which the communication host determines that the communication host finishes receiving the data from the communication slave.

In an embodiment, in a case where the communication initiating unit is the bus-sharing device, after the step of controlling the controlled electrical connection path to work in an output mode to allow data transmission from the communication host side of the controlled electrical connection path to the communication slave, the method further includes: analyzing, by the communication host, data transmitted from the bus-sharing device to obtain an analysis result. In a case where the analysis result indicates that the communication host is required to transmit data to the bus-sharing device, the communication host remains the output mode of the controlled electrical connection path, and communicates with the bus-sharing device directly. In a case where the analysis result indicates that the communication slave is required to transmit data to the communication bus, the communication host controls the controlled electrical connection path to work in the receiving mode to allow data transmission from the communication slave to the communication bus.

In an embodiment, the communication slave pre-stores a waiting time for waiting to transmit data. The waiting time is 0 in a case where the communication slave responds to the communication host. In a case where the communication slave responds to the bus-sharing device, the waiting time is the maximum time period from a time instant at which the bus-sharing device finishes transmitting data to a time instant at which the communication host determines that the communication host finishes receiving the data from the bus-sharing device.

According to a second aspect of the present disclosure, a peer-to-peer communication system is provided, including: a communication transmission path, a controlled electrical connection path, an uncontrolled electrical connection path, two communication interfaces, and at least two communication units. The communication transmission path connects the two communication interfaces. One of the two communication interfaces has a side connected to the communication transmission path, and has another side connected to one of the communication units which serves as a communication host via the controlled electrical connection path. The other one of the two communication interfaces has a side connected to the communication transmission path, and has another side electrically connected to another one of the communication units which serves as a communication slave via the uncontrolled electrical connection path. The peer-to-peer communication system, when powered on, is configured to perform the method for controlling data transmission and reception according to any embodiment in the first aspect of the present disclosure.

In an embodiment, in a case where a number of the communication units is greater than two, each of communication units other than the communication host and the communication slave serves as a bus-sharing device and is connected to the controlled electrical connection path by sharing a communication bus with the communication host.

In an embodiment, the communication host is configured to control, by using a transmission and reception control signal, the mode of the controlled electrical connection path.

In an embodiment, the controlled electrical connection path is controlled to work in a receiving mode when the transmission and reception control signal is at a high level; and the controlled electrical connection path is controlled to work in an output mode when the transmission and reception control signal is at a low level.

In an embodiment, the communication interfaces are optical fiber interfaces, and the communication transmission path is an optical fiber transmission path.

According to a third aspect of the present disclosure, a multi-converter system is provided, including one or more peer-to-peer communication system according to any embodiment in the first aspect of the present disclosure. In the multi-converter system, at least a part of the communication units in each of the peer-to-peer communication systems corresponds to converters.

In an embodiment, in a case where a number of the peer-to-peer communication systems is greater than one, the peer-to-peer communication systems are independent from each other, or at least two of the peer-to-peer communication systems are connected to each other.

According to the above solutions, in the method for controlling data transmission and reception provided in the present disclosure, a peer-to-peer communication system is initialized to set each communication unit in the peer-to-peer communication system to be in a data receiving state. The communication host controls, according to a communication status of the peer-to-peer communication system, a controlled electrical connection path between the communication host and a communication interface to the communication transmission path, to work in a mode allowing data transmission from the communication slave to a communication host side of the controlled electrical connection path, or a mode allowing data transmission from the communication host side of the controlled electrical connection path to the communication slave. In this way, the communication host can control timings of data transmission and reception on both sides of the communication transmission path, which realizes well-scheduled data transmission and reception of the communication units, without an additional hardware control unit for scheduling, and thereby avoids cost increase for the system.

DETAILED DESCRIPTION

In order to make the objectives, technical solutions and advantages of embodiments of the present disclosure clearer, technical solutions of embodiments of the present disclosure are described clearly and completely below in conjunction with the drawings of the embodiments of the present disclosure. Apparently, the embodiments described in the following are only some of rather than all the embodiments of the present disclosure. Any other embodiments obtained by those skilled in the art based on the embodiments in the present disclosure without any creative effort shall fall within the protection scope of the present disclosure.

In this specification, terms "comprise", "include", or any other variants thereof are intended to encompass a non-exclusive inclusion, such that a process, method, article, or device including a series of elements includes not only those elements but also those elements that are not explicitly listed, or elements that are inherent to such process, method, article, or device. Unless expressively limited otherwise, a process, method, article or device limited by "comprising/ including a(n) . . . " does not exclude existence of another identical element in such process, method, article or device.

A method for controlling data transmission and reception is provided according to an embodiment of the present disclosure. The method is applied to a peer-to-peer communication system, and is intended to solve the problem of high cost of the communication system due to the provision of an additional coordinated control unit in the conventional technology.

Figure 1:
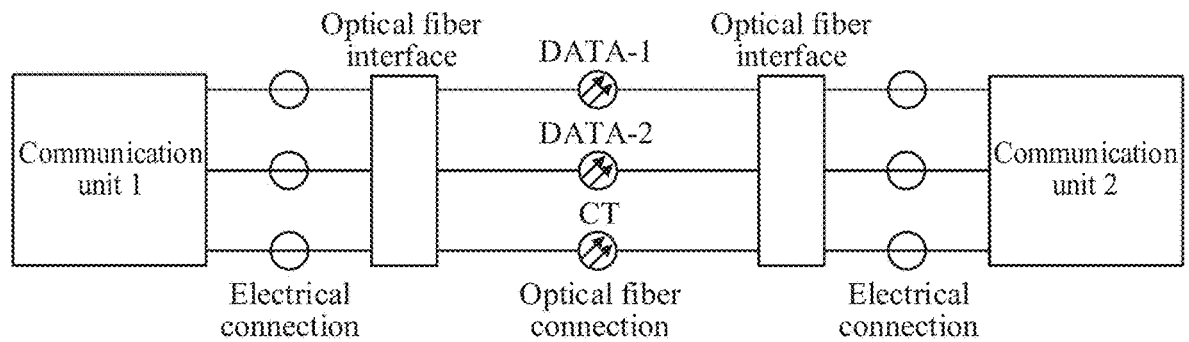
FIG. 1 is a schematic diagram showing a peer-to-peer communication system according to the conventional technology.
Figure 2:
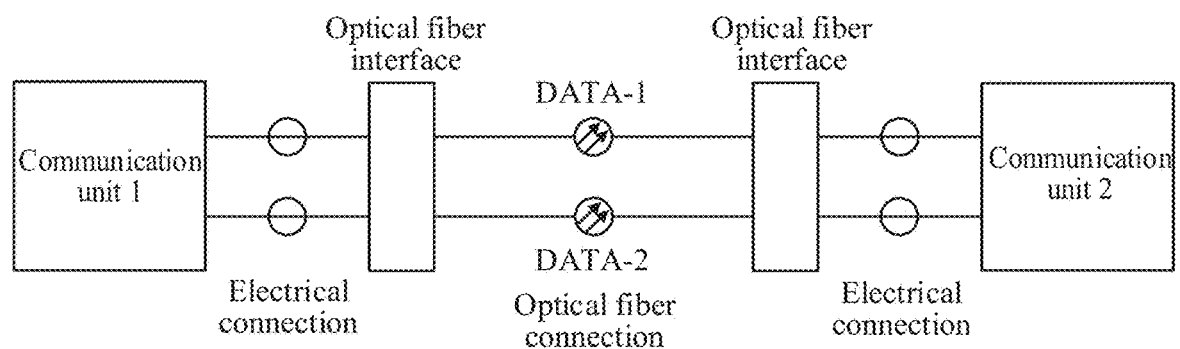
FIG. 2 is a schematic diagram showing another peer-to-peer communication system according to the conventional technology.
Figure 3:
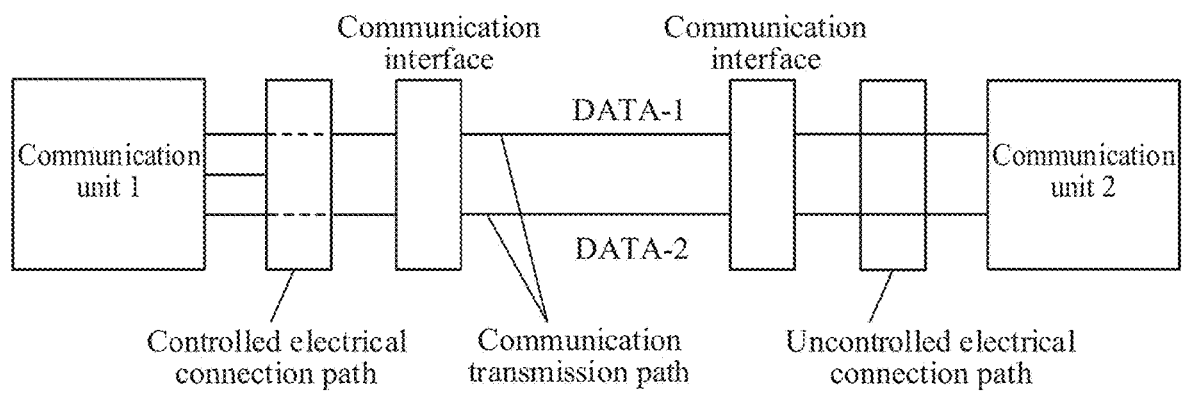
FIG. 3 is a schematic diagram showing a peer-to-peer communication system according to an embodiment of the present disclosure.
Figure 4:
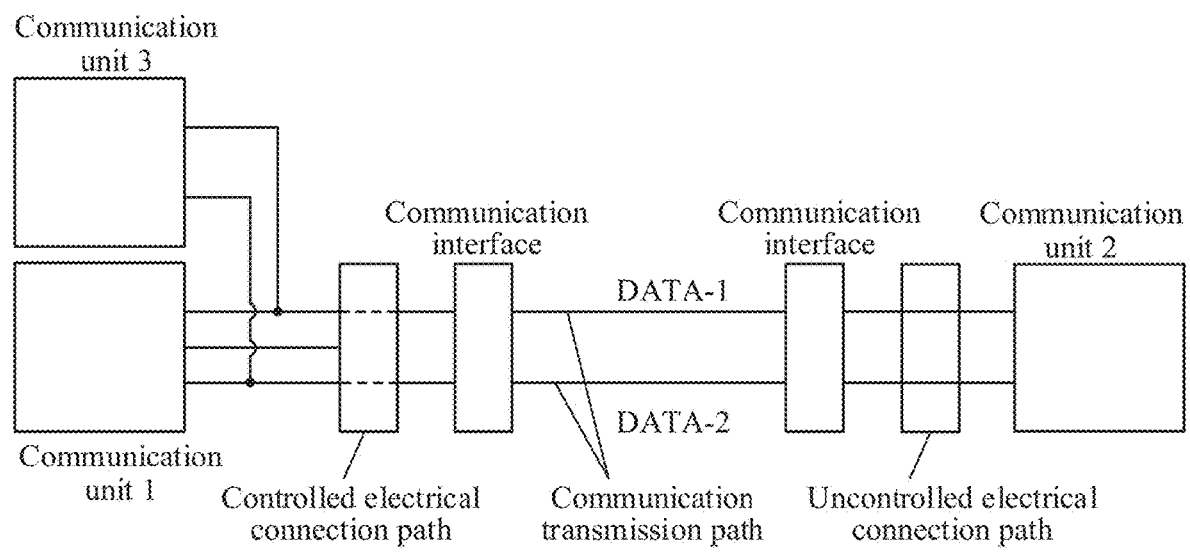
FIG. 4 is a schematic diagram showing a peer-to-peer communication system according to another embodiment of the present disclosure.

Referring to FIG. 3 or FIG. 4, the peer-to-peer communication system includes a communication transmission path, a controlled electrical connection path, an uncontrolled electrical connection path, two communication interfaces, and at least two communication units (such as communication unit 1 and communication unit 2 as shown in FIG. 3, and communication unit 3 as shown in FIG. 4).

The communication transmission path connects the two communication interfaces. One of the two communication interfaces has a side connected to the communication transmission path, and has another side connected to a communication unit serving as a communication host (such as communication unit 1 in FIG. 3 and FIG. 4) via the controlled electrical connection path. The other one of the two communication interfaces has a side connected to the communication transmission path, and has another side electrically connected to a communication unit serving as a communication slave (such as communication unit 2 in FIG. 3 and FIG. 4) via an uncontrolled electrical connection path.

In FIG. 4, at least one communication unit (communication unit 3 shown in FIG. 4) is further provided on a communication host side of the controlled electrical connection path. The at least one communication unit serves as a bus-sharing device and is connected to the controlled electrical connection path by sharing a communication bus with the communication host.

Figure 5:
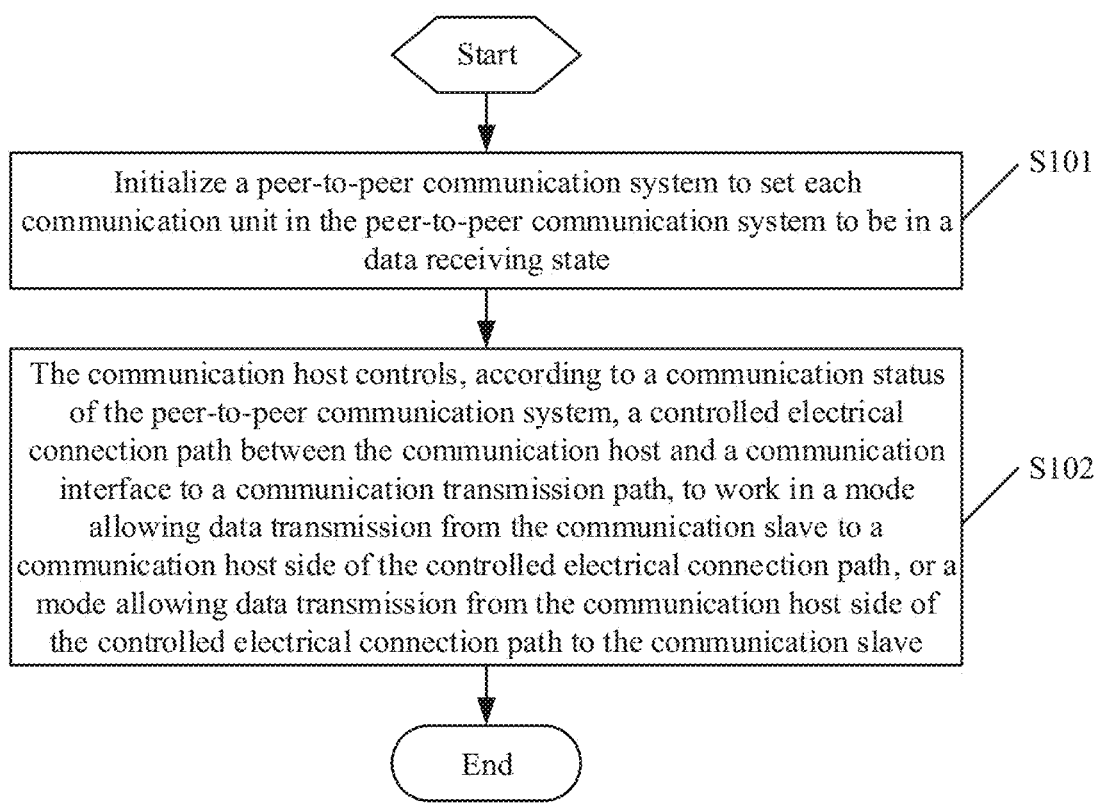
FIG. 5 is a flow chart of a method for controlling data transmission and reception according to an embodiment of the present disclosure.

Referring to FIG. 5, the method for controlling data transmission and reception includes step S101 to S102.

In step S101, the peer-to-peer communication system is initialized to set each of the communication units in the peer-to-peer communication system to be in a data receiving state.

It should be noted that, a communication unit may work in a data receiving state or a data transmitting state, but cannot work in both states, that is, the communication unit cannot perform data transmission and data reception at the same time. After initializing the peer-to-peer communication system, the communication unit 1 and the communication unit 2 in FIG. 3 are both in the data receiving state, or the communication unit 1, the communication unit 2 and the communication unit 3 in FIG. 4 are all in the data receiving state.

When the peer-to-peer communication system is powered on, each of the communication units is activated and initialized, so that each communication unit is in the data receiving state. A detailed process of activating and initializing the communication units is not specifically limited herein, and any procedure of setting each of the communication units of the peer-to-peer communication system to be in a data receiving state shall fall within the protection scope of the present disclosure.

In step S102, the controlled electrical connection path between the communication host and a communication interface to the communication transmission path is controlled by the communication host according to a communication status of the peer-to-peer communication system, to work in a mode allowing data transmission from the communication slave to a communication host side of the controlled electrical connection path, or a mode allowing data transmission from the communication host side of the controlled electrical connection path to the communication slave.

The communication status of the peer-to-peer communication system mainly includes communication in two directions, i.e., data transmission from the communication host side to the communication slave, such as transmission from left to right in FIGS. 3 and FIG. 4, and data transmission from the communication slave to the communication host side, such as transmission from right to left in FIG. 3 and FIG. 4. In a case where the communication status of the peer-to-peer communication system is the data transmission from the communication slave to the communication host side, the communication host controls the controlled electrical connection path to work in a receiving mode to allow data transmission from the communication slave to the communication host side of the controlled electrical connection path through the uncontrolled electrical connection path and the communication transmission path. In a case where the communication status of the peer-to-peer communication system is the data transmission from the communication host side to the communication slave, the communication host controls the controlled electrical connection path to work in an output mode to allow data transmission from the communication host side of the controlled electrical connection path to the communication slave through the controlled electrical connection path, the communication transmission path and the uncontrolled electrical connection path.

In more detail, as shown in FIG. 3, the communication unit 1 serves as a communication host, and the communication unit 2 serves as a communication slave. In a case where the communication status is that the communication unit 2 transmits data to the communication unit 1, the communication unit 1 controls the controlled electrical connection path to work in the receiving mode, that is, the communication unit 1 can receive data transmitted from the communication unit 2. In a case where the communication status is that the communication unit 1 transmits data to the communication unit 2, the communication unit 1 controls the controlled electrical connection path to work in the output mode, that is, the communication unit 1 is can output data to the communication unit 2.

As shown in FIG. 4, the communication unit 1 serves as a communication host, the communication unit 2 serves as the communication slave, and the communication unit 3 serves as a bus-sharing device. In a case where the communication status is that the communication unit 2 transmits data to the communication host side, i.e., the communication unit 1 and/or the communication unit 3, the communication unit 1 controls the controlled electrical connection path to be in the receiving mode, that is, the communication bus where the communication unit 1 and the communication unit 3 are located can receive data transmitted from the communication unit 2. In a case where the communication status is that the communication host side, i.e., the communication unit 1 or the communication unit 3 transmits data to the communication unit 2, the communication unit 1 controls the controlled electrical connection path to work in the output mode, that is, data from the communication unit 1 or the communication unit 3 can be transmitted to the communication unit 2. A middle line drawn in FIG. 3 or FIG. 4 connecting the communication unit 1 and the controlled electrical connection path represents a wire for the communication unit 1 to control a mode of the controlled electrical connection path.

In this embodiment, the controlled electrical connection path is controlled by the communication host according to the communication status of the peer-to-peer communication system, to work in a mode allowing data transmitted by the communication slave to be transmitted to the communication host side of the controlled electrical connection path through the uncontrolled electrical connection path and the communication transmission path, or a mode allowing data from the communication host side of the controlled electrical connection path to be transmitted to the communication slave through the controlled electrical connection path, the communication transmission path, and the uncontrolled electrical connection path. In this way, the communication host can control timings for data transmission and reception on both sides of the communication transmission path, which realizes well-scheduled data transmission and reception of the communication units without an additional hardware control unit for scheduling, and thereby avoids cost increase for the system.

It is to be noted that there is a solution in the conventional technology in which timings of data transmission and reception of communication units is scheduled in advance. However, this solution is applicable to a situation with fixed transmission cycle and fixed data length, but does not work for a situation with unfixed transmission cycle or data length. By contrast, with the solution proposed in the present disclosure, the output/receiving mode of the controlled electrical connection path is controlled based on a communication status of the peer-to-peer communication system, which is suitable for not only the situation with fixed transmission cycle and data length, but also a situation with dynamically adjustable transmission cycle and data length.

Figure 6:
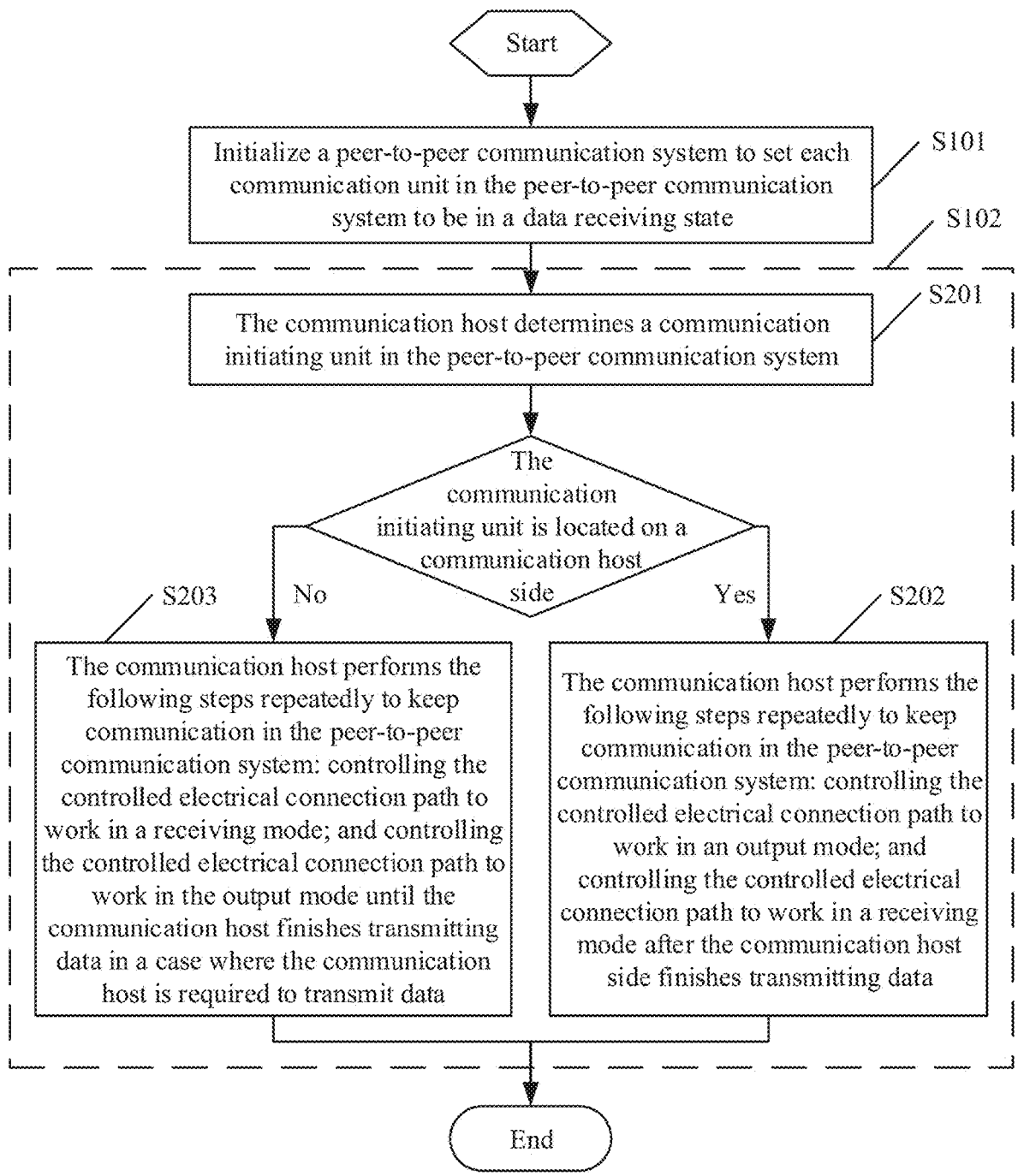
FIG. 6 is a flow chart of a method for controlling data transmission and reception according to another embodiment of the present disclosure.

In an embodiment, step S102 in FIG. 5 is implemented by performing steps S201 to S203 as shown in FIG. 6.

In step S201, a communication initiating unit in the peer-to-peer communication system is determined by the communication host. The communication initiating unit is the communication unit that initiates communication in the peer-to-peer communication system.

Any of the communication units in the peer-to-peer communication system may serve as the communication initiating unit, as long as it initiates the communication. In FIG. 3, if the communication unit 1 initiates communication, the communication unit 1 serves as the communication initiating unit, or if the communication unit 2 initiates communication, the communication unit 2 serves as the communication initiating unit. In FIG. 4, if the communication unit 1 initiates communication, the communication unit 1 serves as the communication initiating unit, or if the communication unit 2 initiates communication, the communication unit 2 serves as the communication initiating unit, or if the communication unit 3 initiates communication, the communication unit 3 serves as the communication initiating unit.

The communication host controls the controlled electrical connection path to work in different modes depending on the side of the communication transmission path where the communication initiating unit is located. In a case where the communication initiating unit is located on the communication host side, the method proceeds to step S202; and in a case where the communication initiating unit is not located on the communication host side, that is, located on the communication slave side, the method proceeds to step S203.

In step S202, the communication host first controls the controlled electrical connection path to work in the output mode, and then controls the controlled electrical connection path to work in the receiving mode after the communication host side finishes transmitting data, which are repeated to perform communication in the peer-to-peer communication system.

When the controlled electrical connection path is controlled by the communication host to work in the output mode, data on the communication host side of the controlled electrical connection path can be transmitted to the communication slave sequentially through the controlled electrical connection path, the communication transmission path, and the uncontrolled electrical connection path. After the communication host side of the controlled electrical connection path finishes transmitting data, the controlled electrical connection path is controlled by the communication host to work in the receiving mode, so that data transmitted from the communication slave can be transmitted to the communication host side of the controlled electrical connection path sequentially through the uncontrolled electrical connection path and the communication transmission path. Thereafter, the above controls are repeated to realize communication in the peer-to-peer communication system, i.e., the data transmission between the communication host side and the communication slave side.

As shown in FIG. 3, the communication unit 1 first controls the controlled electrical connection path to work in the output mode to allow data of the communication unit 1 to be transmitted to the communication unit 2. When the communication unit 1 finishes transmitting data, the communication unit 1 controls the controlled electrical connection path to work in the receiving mode to allow data of the communication unit 2 to be transmitted to the communication unit 1. After the reception, the communication unit 1 repeats the above steps to keep communication between the communication unit 1 and the communication unit 2. In FIG. 4, the communication unit 1 and the communication unit 3 are considered as a first side, and the communication unit 2 is considered as a second side. The communication unit 1 first controls the controlled electrical connection path to work in the output mode, allowing data on the first side to be transmitted to the second side. After the first side finishes transmitting data, the communication unit 1 controls the controlled electrical connection path to work in the receiving mode, allowing data on the second side to be transmitted to the first side. After the reception, the communication unit 1 repeats the above steps.

In a case where the peer-to-peer communication system includes at least one bus-sharing device (such as communication unit 3 as shown in FIG. 4), if the bus-sharing device serves as the communication initiating unit, the communication host controls the controlled electrical connection path to work in the output mode, allowing data of the bus-sharing device to be transmitted to the communication slave sequentially through the communication bus, the controlled electrical connection path, the communication transmission path and the uncontrolled electrical connection path. Then, the method includes the following steps.

The communication host analyzes the data transmitted by the bus-sharing device to obtain an analysis result. In a case where the analysis result indicates that the communication host is required to transmit data to the bus-sharing device, the communication host remains the working mode of the controlled electrical connection path, and communicates with the bus-sharing device directly. In a case where the analysis result indicates that the communication slave is required to transmit data to the communication bus, the communication host controls the controlled electrical connection path to work in the receiving mode, allowing data transmitted from the communication slave to be transmitted to the communication bus.

Referring to FIG. 4, the communication unit 1 serves as the communication host, and the communication unit 3 serves as the bus-sharing device and the communication initiating unit. After controlling the controlled electrical connection path to work in the output mode, the communication unit 1 analyses data transmitted from the communication unit 3. In a case where the communication unit 1 determines, from the analyzing, that the communication unit 1 is required to transmit data to the communication unit 3, the communication unit 1 remains the mode of the controlled electrical connection path, and communicates with the communication unit 3 directly, so that the communication unit 2 can continue receiving data from the communication bus. In a case where the communication unit 1 determines, from the analyzing, that the communication unit 2 is required to transmit data to the communication bus, the communication unit 1 controls the controlled electrical connection path to work in the receiving mode, to allow data transmitted from the communication unit 2 to be transmitted to the communication bus.

In step S203, the communication host controls the controlled electrical connection path to work in the receiving mode; and then controls the controlled electrical connection path to work in the output mode in a case where the communication host is required to transmit data. After the communication host finishes transmitting data, the communication host repeats the above steps to realize communication in the peer-to-peer communication system.

When the controlled electrical connection path is controlled by the communication host to work in the receiving mode, data transmitted from the communication slave can be transmitted to the communication host side of the controlled electrical connection path sequentially through the uncontrolled electrical connection path and the communication transmission path. When the controlled electrical connection path is controlled by the communication host to work in the output mode, data transmitted from the communication host can be transmitted to the communication slave sequentially through the controlled electrical connection path, the communication transmission path and the uncontrolled electrical connection path. When the communication host finishes transmitting data, the above controls are repeated to realize communication in the peer-to-peer communication system, i.e., the data transmission between the communication host side and the communication slave side.

As shown in FIG. 3, the communication unit 1 first controls the controlled electrical connection path to work in the receiving mode, to allow data of the communication unit 2 to be transmitted to the communication unit 1; and then controls the controlled electrical connection path to work in the output mode in a case where the communication unit 1 is required to transmit data, to allow data of the communication unit 1 to be transmitted to the communication unit 2. The above controls are repeated after data transmission from the communication unit 1 is finished, so as to keep communication between the communication unit 1 and the communication unit 2. As shown in FIG. 4, the communication unit 1 and the communication unit 3 are considered as a first side, and the communication unit 2 is considered as a second side. The communication unit 1 first controls the controlled electrical connection path to work in the receiving mode, to allow data on the second side to be transmitted to the first side. After data reception at the first side is finished and in a case where the first side is required to transmit data, the communication unit 1 controls the controlled electrical connection path to work in the output mode to allow data on the first side to be transmitted to the second side. After the data transmission from the first side is finished, the communication unit 1 repeats the above controls.

In this embodiment, the sequence and duration of the receiving/output mode of the controlled electrical connection path are controlled differently by the communication host for different communication units serving as the communication initiating unit, so that when data transmission is initiated, each communication unit other than the communication initiating unit is in the data receiving state, achieving well-scheduled data transmission and reception of the communication units in the communication system.

It should be noted that there is a solution in the conventional technology in which communication units autonomously cooperate to schedule timing of transmission and reception for communication. For example, a transmission from the communication unit 2 is started after the communication unit 2 receives data from the communication unit 1, and a transmission from the communication unit 1 is started after the communication unit 1 receives data from the communication unit 2. However, in this solution, the communication is terminated when the communication unit 2 fails to transmit data, which results in a low reliability of communication in the system.

In order to avoid termination of communication due to absent of data transmission from the communication slave, in step S202 and/or step S203, if the communication host fails to receive data transmitted from the communication slave in a preset time period, the communication host controls the controlled electrical connection path to work in the output mode, to allow data transmitted by the communication host to be transmitted to the communication slave through the controlled electrical connection path, the communication transmission path and the uncontrolled electrical connection path. Therefore, the communication host can continue the data transmission, so as to maintain the communication.

Here, taking step S202 as an example, the communication host controls the controlled electrical connection path to work in the output mode, to allow data on the communication host side of the controlled electrical connection path to be transmitted to the communication slave. When the communication host side of the controlled electrical connection path finishes transmitting data, the communication host controls the controlled electrical connection path to work in the receiving mode. In this case, data of the communication slave is transmitted to the communication host, that is, the communication host may receive the data transmitted from the communication slave in a preset time period in a normal situation. However, if the communication host fails to receive data from the communication slave in the preset time period, that is, in a situation where the communication slave does not transmit data, the communication host controls the controlled electrical connection path to work in the output mode to allow data of the communication host to be transmitted to the communication slave, so that the communication slave can respond to the communication host. The above function may be performed in step S203, the procedure of which is similar and is not repeated herein.

In practice, in a case where the communication host serves as the communication initiating unit, a maximum value T of the preset time period is calculated by an equation T=T1+T2+T3, where T1 represents a maximum time period from a time instant at which the communication host (such as communication unit 1 shown in FIG. 3) finishes transmitting data to a time instant at which the communication slave (such as communication unit 2 shown in FIG. 3) determines that the communication slave finishes receiving the data from the communication host, T2 represents a time period required for the communication slave (such as communication unit 2 shown in FIG. 3) to transmit data, and T3 represents a maximum time period from a time instant at which the communication slave (such as communication unit 2 shown in FIG. 3) finishes transmitting data to a time instant at which the communication host (such as communication unit 1 shown in FIG. 3) determines that the communication host finishes receiving the data from the communication slave. In designing a system in practice, the value of the preset duration may be equal to T, or may be appropriately optimized based on an actual application environment, that is, taking an appropriate value less than T in order to shorten a waiting time of the communication host. Taking a value less than or equal to T as the preset duration is only a preferred solution. A practical application in which the value of the preset duration is greater than T also falls within the protection scope of the present disclosure.

It should be noted that in a case where the communication slave serves as the communication initiating unit, the above equation described for calculating the preset duration when the communication host serves as the communication initiating unit is also applicable, but the determination of whether the communication host receives data from the communication slave in a preset duration is performed after the communication host finishes receiving the data from the communication slave and then finishes transmitting data. In other words, after transmitting data to the communication slave, the communication host will continue to transmit data to the communication slave if the communication host fails to receive data from the communication slave in the preset duration.

Referring to FIG. 4, in a case where the bus-sharing device (communication unit 3 shown in FIG. 4) serves as the communication initiating unit, the maximum value T of the preset time period is calculated by an equation T=T4+T5+T2+T3, where T4 represents a maximum time period from a time instant at which the bus-sharing device (such as communication unit 3 shown in FIG. 4) finishes transmitting data to a time instant at which the communication host (such as communication unit 1 shown in FIG. 4) determines that the communication host finishes receiving the data form the bus-sharing device, T5 represents a maximum time period from a time instant at which the bus-sharing device (such as communication unit 3 shown in FIG. 4) finishes transmitting data to a time instant at which the communication slave (such as communication unit 2 shown in FIG. 4) determines that the communication slave finishes receiving the data from the bus-sharing device, T2 represents a time period required for the communication slave (such as communication unit 2 shown in FIG. 4) to transmit data, and T3 represents a maximum time period from a time instant at which the communication slave (such as communication unit 1 shown in FIG. 4) finishes transmitting data to a time instant at which the communication host (such as communication unit 1 shown in FIG. 4) determines that the communication host finishes receiving the data from the communication slave. In designing a system in practice, the value of the preset duration may be equal to T, or may be appropriately optimized based on an actual application environment, that is, taking an appropriate value less than T in order to shorten a waiting time of the communication host. Taking a value less than or equal to T as the preset duration is only a preferred solution. A practical application in which the value of the preset duration is greater than T also falls within the protection scope of the present disclosure.

In practice, the time instant when the communication host switches a working mode of the controlled electrical connection path may be different from the time instant when the communication slave is required to transmit data. Therefore, the communication slave may set a waiting time for waiting to transmit data after being required to transmit the data, in order to avoid failure of data transmission from the communication slave to the communication host in a case that the communication host does not switch the working mode of the controlled electrical connection path before the communication slave transmits the data.

Moreover, a time period required for the communication host to switch the working mode of the controlled electrical connection path is different depending on whether the communication initiating unit is the communication host or the bus-sharing device. Therefore, the waiting time may be set for different situations. For example, the waiting time may be 0 in a case where the communication slave responds to the communication host; and in a case where the communication slave responds to the bus-sharing device, the waiting time may be the maximum time period from a time instant at which the bus-sharing device finishes transmitting data to a time instant at which the communication host determines that the communication host finishes receiving the data from the bus-sharing device.

Hereinafter, a specific working procedure of the peer-to-peer communication system after initialization is described with a practical application of the peer-to-peer communication system.

Referring to FIG. 3 and FIG. 4, the communication unit 1 serves as a communication host, the communication unit 2 serves as a communication slave, and the communication unit 3 serves as a bus-sharing device. A working mode of the controlled electrical connection path is controlled by using a transmission and reception control signal.

(1) In a case where the communication unit 1 serves as a communication initiating unit, the peer-to-peer communication system works in the following manners.
1. The communication unit 1 initializes a status of the transmission and reception control signal to allow the communication unit 2 to receive data from a communication bus/the communication unit 1.
2. The communication unit 1 transmits data to the communication unit 2.
3. The communication unit 1, after finishing the data transmission, switches the status of the transmission and reception control signal to allow the communication unit 1 to receive data transmitted from the communication unit 2.
4. The communication unit 2, after determining that the communication unit 2 finishes receiving the data from the communication unit 1, transmits data to the communication bus/communication unit 1 if determining, by analysis, that the communication unit 2 is required to transmit data.
5. The communication unit 1, after determining that the communication unit 1 finishes receiving the data from the communication unit 2, switches the status of the transmission and reception control signal to allow the communication unit 2 to receive data transmitted by the communication unit 1.

After step 5, the procedure returns to step 2 to repeatedly perform steps 2 to 5, keeping communication in the peer-to-peer communication system.

In addition, in a case where the communication unit 1 fails to receive data from the communication unit 2 in a preset time period, the communication unit 1 switches the status of the transmission and reception control signal to allow the communication unit 2 to receive data transmitted from the communication unit 1. The preset time period T is calculated by an equation T=T1+T2+T3, where T1 represents a maximum time period from a time instant at which the communication unit 1 finishes transmitting data to a time instant at which the communication unit 2 determines that the communication unit 2 finishes receiving the data from the communication unit 1, T2 represents a time period required for the communication unit 2 to transmit data, and T3 represents a maximum time period from a time instant at which the communication unit 2 finishes transmitting data to a time instant at which the communication unit 1 determines that the communication unit 1 finishes receiving the data from the communication unit 2.

(2) In a case where the communication unit 3 serves as a communication initiating unit, the peer-to-peer communication system works in the following manners.
1. The communication unit 1 initializes a status of the transmission and reception control signal to allow the communication unit 2 to receive data from a communication bus, i.e. the communication unit 3.
2. The communication unit 1 and the communication unit 2 receive data from the communication bus at the same time.
3. The communication unit 1, after determining that the communication unit 1 finishes receiving the data from the communication bus, operates as follows:
   if determining, by analysis, that the communication unit 1 is required to transmit data to the communication bus, the communication unit 1 remains the status of the transmission and reception control signal to still allow the communication unit 2 to receive data from the communication bus; or
   if determining, by analysis, that the communication unit 2 is required to transmit data to the communication bus, the communication unit 1 switches the status of the transmission and reception control signal to allow the communication bus (that is, the communication unit 1 and the communication unit 3) to receive data transmitted from the communication unit 2.
4. The communication unit 2, after determining that the communication unit 2 finishes receiving the data from the communication bus, starts to transmit data after a time period T4 if determining, by analysis, that the communication unit 2 is required to transmit data to the communication bus. T4 represents a maximum time period from a time instant at which the communication unit 3 finishes transmitting data to a time instant at which the communication unit 1 determines that the communication unit 1 finishes receiving the data from the communication unit 3.
5. The communication unit 1, after determining that the communication unit 1 finishes receiving the data from the communication unit 2, switches the status of the transmission and reception control signal to allow the communication unit 2 to receive data from the communication bus.

After step 5, the procedure returns to step 2 to repeatedly perform steps 2 to 5, realizing communication in the peer-to-peer communication system.

In addition, in a case where the communication unit 1 fails to receive data from the communication unit 2 in a preset time period, the communication unit 1 switches the status of the transmission and reception control signal to allow the communication unit 2 to receive data from the communication bus. The preset time period T is calculated by an equation T=T4+T5+T2+T3, where T4 represents a maximum time period from a time instant at which the communication unit 3 finishes transmitting data to a time instant at which the communication unit 1 determines that the communication unit 1 finishes receiving the data from the communication unit 3, T5 represents a maximum time period from a time instant at which the communication unit 3 finishes transmitting data to a time instant at which the communication unit 2 determines that the communication unit 2 finishes receiving the data from the communication unit 3, T2 represents a time period required for the communication unit 2 to transmit data, and T3 represents a maximum time period from a time instant at which the communication unit 1 finishes transmitting data to a time instant at which the communication unit 1 determines that the communication unit finishes receiving the data from the communication unit 2.

(3) In a case where the communication unit 2 serves as a communication initiating unit, the peer-to-peer communication system works in the following manners.

1. The communication unit 1 initializes a status of the transmission and reception control signal to allow the communication unit 1/communication bus to receive data from the communication unit 2.
2. The communication unit 1, after determining that the communication unit 1 finishes receiving the data from the communication unit 2 and determining, by analysis, that the communication unit 1 is required to transmit data to the communication unit 2, switches the status of the transmission and reception control signal to allow the communication unit 2 to receive data transmitted from the communication unit 1, and starts to transmit data.
3. The communication unit 1, after finishing the data transmission, switches the status of the transmission and reception control signal to allow the communication unit 1 to receive data transmitted by the communication unit 2.

After step 3, the procedure returns to step 2 to repeatedly perform steps 2 to 3, realizing communication in the peer-to-peer communication system.

A peer-to-peer communication system is further provided according to another embodiment of the present disclosure. Referring to FIG. 3 or FIG. 4, the peer-to-peer communication system includes a communication transmission path, a controlled electrical connection path, an uncontrolled electrical connection path, two communication interfaces, and at least two communications units (such as communication unit 1 and communication unit 2 shown in FIG. 3 and FIG. 4, and communication unit 3 shown in FIG. 4).

The communication transmission path connects the two communication interfaces. One of the two communication interfaces has a side connected to the communication transmission path, and has another side connected to a communication unit serving as a communication host via the controlled electrical connection path. The other one of the two communication interfaces has a side connected to the communication transmission path, and has another side electrically connected to a communication unit serving as a communication slave via the uncontrolled electrical connection path.

Referring to FIG. 3, each of the two communication interfaces has a side connected to the communication transmission path. The communication unit 1, which serves as the communication host, is connected to the other side of one of the communication interfaces via the controlled electrical connection path. The communication unit 2, which serves as the communication slave, is connected to the other side of the other one of the communication interfaces via the uncontrolled electrical connection path.

In a case where the number of communication units is greater than two, each communication unit other than the communication host and the communication slave serves as a bus-sharing device, which is connected to the controlled electrical connection path by sharing a communication bus with the communication host. Referring to FIG. 4, the communication unit 1 serves as the communication host, and the communication unit 2 serves as the communication slave. The communication transmission path is connected to a side of each communication interfaces. The communication unit 3, which serves as the bus-sharing device is connected to, as the communication unit 1, the other side of one communication interface via the controlled electrical connection path. The communication unit 2 is connected to the other side of the other communication interface via the uncontrolled electrical connection path.

A middle line drawn in FIG. 3 or FIG. 4 connecting the communication unit 1 and the controlled electrical connection path represents a control wire for the communication unit 1 to control a working mode of the controlled electrical connection path. The control wire is used to transmit a transmission and reception control signal from the communication host to control the controlled electrical connection path to work in a corresponding working mode. Referring to FIG. 3 and FIG. 4, when the transmission and reception control signal is at a high level, the controlled electrical connection path is controlled to work in a receiving mode, utilizing a second transmission path DATA-2 to transmit data from right to left, for example. When the transmission and reception control signal is at a low level, the controlled electrical connection path is controlled to work in an output mode, utilizing a first transmission path DATA-1 to transmit data from left to right, for example. In other words, on the second transmission path DATA-2, data can only be transmitted in the direction from the communication slave to the communication host side of the controlled electrical connection path, and on the first transmission path DATA-1, data can only be transmitted in the direction from the communication host side of the controlled electrical connection path to the communication slave.

In addition, the communication interfaces may be optical fiber interfaces, and the communication transmission path may be an optical fiber transmission path, that is, the communication medium between the two optical fiber interfaces is an optical fiber. An optical wave signal in the optical fiber transmission path is converted to an electrical signal by the optical fiber interface and then transmitted to a communication unit. An electrical signal transmitted from a communication unit is converted to an optical wave signal by the optical fiber interface and then transmitted to the optical fiber transmission path. The implementations of the communication interfaces and the communication transmission path are not specifically limited herein. A communication system adopting any other communication medium shall also fall with the protection scope of the present disclosure when applying the method for controlling data transmission and reception disclosed herein.

The peer-to-peer communication system, when powered on, is configured to perform the method for controlling data transmission and reception provided in any of the foregoing embodiments. For details of the peer-to-peer communication system, one may refer to the above embodiments, which are not repeated herein.

In this embodiment, any communication unit may serve as a communication host, which improves reliability of communication in the peer-to-peer communication system without increasing the cost. Besides, the peer-to-peer communication system has no special restriction on data length, communication cycle for the communication units, and therefore is applicable to occasions where the communication cycle or the data length are dynamically adjustable.

In addition, control of data transmission and reception between the communication slave side and the communication host side in the peer-to-peer communication system is realized by providing a local transmission and reception control signal on the communication host side, which saves cost for communication interfaces and communication transmission path in the peer-to-peer system, facilitates wiring in the peer-to-peer communication system, especially for the peer-to-peer communication system having a large number of communication units, and can realize an easy control of data transmission between a communication unit in another system and a communication unit in the present system.

Figure 7:
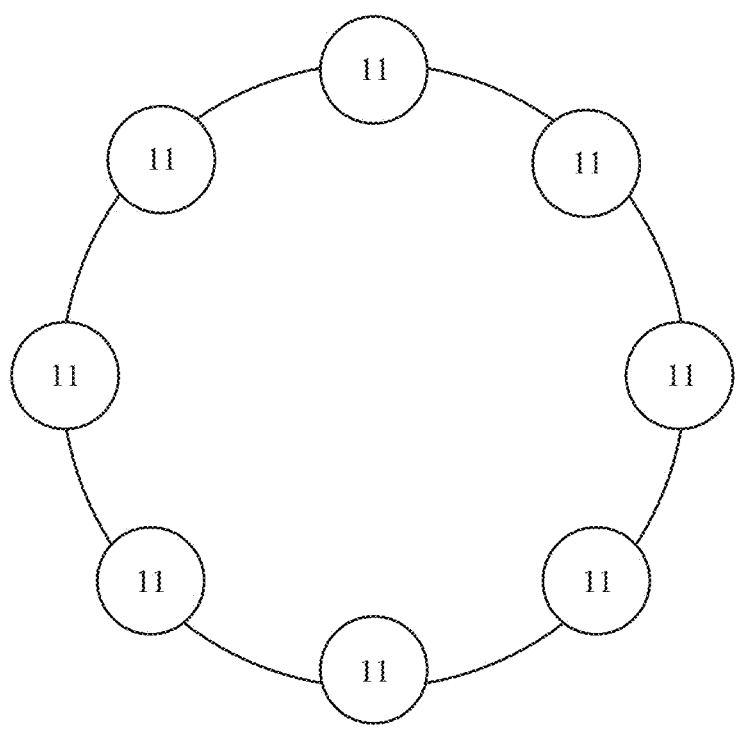
FIG. 7 is a schematic structural diagram of a multi-converter system according to an embodiment of the present disclosure.
Figure 8:
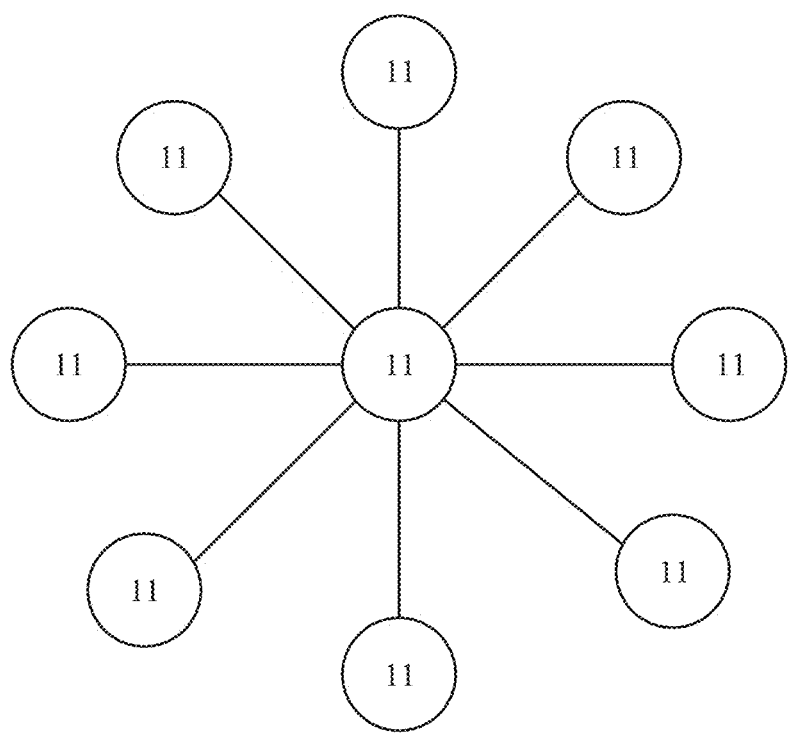
FIG. 8 is a schematic structural diagram of a multi-converter system according to another embodiment of the present disclosure.

A multi-converter system is further provided according to an embodiment of the present disclosure. Referring to FIG. 7 or FIG. 8, the multi-converter system includes at least one peer-to-peer communication system.

In the peer-to-peer communication system, each communication unit 11 may correspond to a converter. The converter may be an inverter or a DC/DC converter, or an optimizer, which is not specifically limited herein and all shall fall within the protection scope of the present disclosure. Moreover, in practice, the communication unit 11 may be a device not able to perform power conversion, such as a breaker. The communication unit 11 is a communication part in the device (converter or breaker).

In practice, the multi-converter system may include one peer-to-peer communication system (not shown) or multiple peer-to-peer communication systems (as shown in FIG. 7 and FIG. 8). In a case where the multi-converter system includes multiple peer-to-peer communication systems, the peer-to-peer communication systems may or may not have a connection relationship, that is, the peer-to-peer communication systems may be independent from each other, or at least two of the peer-to-peer communication systems are connected to each other.

Further, a connection topology of the peer-to-peer communication systems may include: a ring in which the peer-to-peer communication systems connected one by one (as shown in FIG. 7); a topology in which multiple peer-to-peer communication systems share a communication unit as a communication host, and the communication host is connected to communication units serving as communication slaves in the multiple peer-to-peer communication systems (as shown in FIG. 8); a topology in which some communication units in different peer-to-peer communication systems serve as bus-sharing devices to each other; or a combination thereof. In other words, the connection topology of multiple peer-to-peer communication systems may be determined based on an actual situation and all shall fall within the protection scope of the present disclosure.

It should be noted that the multi-converter system may be an SVG (Static Var Generator, which is a dynamic reactive power compensation device), a photovoltaic inverter system, a micro-grid system or any other system or device including multiple converters, which is not described in detail, and all shall fall within the protection scope of the present disclosure.

In the multi-converter system, for the working procedure and specific structure of the peer-to-peer communication system, one may refer to the aforementioned embodiments, which are not repeated herein, and all shall fall within the protection scope of the present disclosure.

The features cited in embodiments of the present disclosure may be replaced or combined with each other, the same or similar parts among the embodiments may be referred to each other, and each embodiment places emphasis on the difference from another embodiment. Since the system disclosed in the embodiments is basically similar to the method therein, the description thereof is relatively simple, and reference may be made to the description of the method for relevant matters. The described system and the embodiments of the system are only schematic. A unit described as a discrete component may or may not be physically separated. Components shown as units may or may not be physical units, that is, the components may be located in one place or may be distributed onto multiple network units. Some or all modules thereof may be selected based on an actual requirement, to implement an objective of the solution in the embodiments. Those skilled in the art may understand and implement the present disclosure without any creative effort.

It is further understood by those skilled in the art that units and algorithm steps described in combination with the disclosed embodiments may be implemented by electronic hardware, computer software or a combination thereof. In order to clearly describe interchangeability of the hardware and the software, the units and the steps are generally described above in view of their functions. The functions may be implemented by hardware or by software depending on applications and design constraints of the technical solutions. Those skilled in the art may use different methods for each particular application to implement the described functions, but such implementation should not be considered as going beyond the scope of the present disclosure.

The description of the embodiments herein enables those skilled in the art to implement or use the present disclosure. Many modifications to these embodiments are apparent for those skilled in the art. The general principles defined herein may be applied to other embodiments without departing from the spirit or scope of the present disclosure. Therefore, the present disclosure is not limited to the embodiments illustrated herein, but is to conform to the broadest scope consistent with the principles and novel features disclosed herein.

The invention claimed is:

1. A method for controlling data transmission and reception, wherein the method is applied to a peer-to-peer communication system in which a communication unit at either end of a communication transmission path serves as a communication host, and a communication unit at the other end of the communication transmission path serves as a communication slave, and the method comprises steps of:

initializing the peer-to-peer communication system to set each communication unit in the peer-to-peer communication system to be in a data receiving state; and controlling, by the communication host according to whether a communication initiating unit is located on a communication host side of a controlled electrical connection path, the controlled electrical connection path between the communication host and a communication interface to the communication transmission path, to work in a mode allowing data transmission from the communication slave to the communication host side of the controlled electrical connection path, or a mode allowing data transmission from the communication host side of the controlled electrical connection path to the communication slave;

wherein the communication initiating unit is a communication unit that initiates communication in the peer-to-peer communication system.

2. The method for controlling data transmission and reception according to claim 1, wherein the step of controlling, by the communication host according to whether a communication initiating unit is located on a communication host side of a controlled electrical connection path, the controlled electrical connection path between the communication host and a communication interface to the communication transmission path, to work in a mode allowing data transmission from the communication slave to the communication host side of the controlled electrical connection path, or a mode allowing data transmission from the communication host side of the controlled electrical connection path to the communication slave comprises:

determining, by the communication host, a communication initiating unit in the peer-to-peer communication system, performing, in a case where the communication initiating unit is located on the communication host side of the controlled electrical connection path, the following steps by the communication host repeatedly to keep communication in the peer-to-peer communication system:

controlling the controlled electrical connection path to work in an output mode to allow data transmission from the communication host side of the controlled electrical connection path to the communication slave; and then controlling, after the communication host side of the controlled electrical connection path finishes transmitting data, the controlled electrical connection path to work in a receiving mode, to allow data transmission from the communication slave to the communication host side of the controlled electrical connection path; and performing, in a case where the communication initiating unit is located on a communication slave side of the controlled electrical connection path, the following steps by the communication host repeatedly to keep communication in the peer-to-peer communication system:

controlling the controlled electrical connection path to work in the receiving mode to allow data transmission from the communication slave to the communication host side of the controlled electrical connection path; and then controlling, in a case where the communication host is required to transmit data, the controlled electrical connection path to work in the output mode to allow data transmission from the communication host to the communication slave, until the communication host finishes transmitting data.

3. The method for controlling data transmission and reception according to claim 2, wherein the step of controlling, by the communication host according to whether a communication initiating unit is located on a communication host side of a controlled electrical connection path, the controlled electrical connection path between the communication host and a communication interface to the communication transmission path, to work in a mode allowing data transmission from the communication slave to the communication host side of the controlled electrical connection path, or a mode allowing data transmission from the communication host side of the controlled electrical connection path to the communication slave further comprises:

controlling, in a case where the communication host fails to receive data from the communication slave in a preset time period, the controlled electrical connection path to work in the output mode to allow data transmission from the communication host to the communication slave.

4. The method for controlling data transmission and reception according to claim 3, wherein in a case where the communication initiating unit is the communication host, a maximum value T of the preset time period is calculated by an equation $T=T1+T2+T3$, where T1 represents a maximum time period from a time instant at which the communication host finishes transmitting data to a time instant at which the communication slave determines that the communication slave finishes receiving the data from the communication host, T2 represents a time period required for the communication slave to transmit data, and T3 represents a maximum time period from a time instant at which the communication slave finishes transmitting data to a time instant at which the communication host determines that the communication host finishes receiving the data from the communication slave.

5. The method for controlling data transmission and reception according to claim 3, wherein the peer-to-peer communication system is provided with at least one another communication unit on the communication host side, and the at least one another communication unit each serves as a bus-sharing device and is connected to the controlled electrical connection path by sharing a communication bus with the communication host, wherein in a case where the communication initiating unit is the bus-sharing device, the maximum value T of the preset time period is calculated by an equation $T=T4+T5+T2+T3$, wherein, T4 represents a maximum time period from a time instant at which the bus-sharing device finishes transmitting data to a time instant at which the communication host determines that the communication host finishes receiving the data from the bus-sharing device, T5 represents a maximum time period from the time instant at which the bus-sharing device finishes transmitting the data to a time instant at which the communication slave determines that the communication slave finishes receiving the data from the bus-sharing device, T2 represents a time period required for the communication slave to transmit data, and T3 represents a maximum time period from a time instant at which the communication slave finishes transmitting data to a time instant at which the communication host determines that the communication host finishes receiving the data from the communication slave.

6. The method for controlling data transmission and reception according to claim 5, wherein in a case where the communication initiating unit is the bus-sharing device, after the step of controlling the controlled electrical connection path to work in an output mode to allow data transmission from the communication host side of the controlled electrical connection path to the communication slave, the method further comprises:

analyzing, by the communication host, data transmitted from the bus-sharing device to obtain an analysis result, remaining, by the communication host, the output mode of the controlled electrical connection path, and communicating with the bus-sharing device directly, in a case where the analysis result indicates that the communication host is required to transmit data to the bus-sharing device; and controlling, by the communication host, the controlled electrical connection path to work in the receiving mode to allow data transmission from the communication slave to the communication bus, in a case where the analysis result indicates that the communication slave is required to transmit data to the communication bus.

7. The method for controlling data transmission and reception according to claim 5, wherein the communication slave pre-stores a waiting time for waiting to transmit data, wherein the waiting time is 0 in a case where the communication slave responds to the communication host; and in a case where the communication slave responds to the bus-sharing device, the waiting time is the maximum time period from a time instant at which the bus-sharing device finishes transmitting data to a time instant at which the communication host determines that the communication host finishes receiving the data from the bus-sharing device.

8. A peer-to-peer communication system, comprising a communication transmission path, a controlled electrical connection path, an uncontrolled electrical connection path, two communication interfaces, and at least two communication units, wherein:

the communication transmission path connects the two communication interfaces;

one of the two communication interfaces has a side connected to the communication transmission path, and has another side connected to one of the communication units which serves as a communication host via the controlled electrical connection path;

the other one of the two communication interfaces has a side connected to the communication transmission path, and has another side electrically connected to another one of the communication units which serves as a communication slave via the uncontrolled electrical connection path, and wherein the peer-to-peer communication system, when powered on, is configured to perform the method for controlling data transmission and reception according to claim 1.

9. The peer-to-peer communication system according to claim 8, wherein in a case where a number of the communication units is greater than two, each of communication units other than the communication host and the communication slave serves as a bus-sharing device and is connected to the controlled electrical connection path by sharing a communication bus with the communication host.

10. The peer-to-peer communication system according to claim 8, wherein the communication host is configured to control, by using a transmission and reception control signal, the mode of the controlled electrical connection path.

11. The peer-to-peer communication system according to claim 10, wherein the controlled electrical connection path is controlled to work in a receiving mode when the transmission and reception control signal is at a high level; and the controlled electrical connection path is controlled to work in an output mode when the transmission and reception control signal is at a low level.

12. The peer-to-peer communication system according to claim 8, wherein the communication interfaces are optical fiber interfaces, and the communication transmission path is an optical fiber transmission path.

13. A multi-converter system, comprising one or more peer-to-peer communication systems according to claim 8, wherein at least a part of the communication units in each of the peer-to-peer communication systems corresponds to converters.

14. The multi-converter system according to claim 13, wherein in a case where a number of the peer-to-peer communication systems is greater than one, the peer-to-peer communication systems are independent from each other, or at least two of the peer-to-peer communication systems are connected to each other.

* * * * *